(No Model.)
A. K. SUDDOTH.
APPARATUS FOR MEASURING PROPORTIONAL PARTS FOR MIXTURES.
No. 502,596. Patented Aug. 1, 1893.
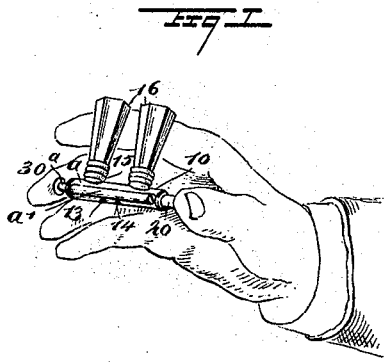
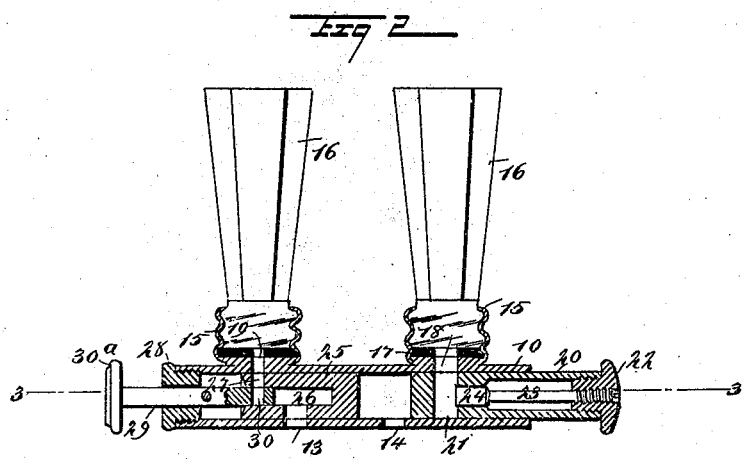
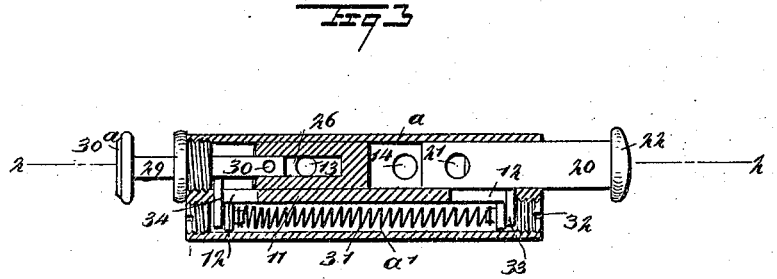
WITNESSES:
H. Walker
C. Sedgwick
INVENTOR
A. K. Suddoth
BY
Munn & Co
ATTORNEYS.

UNITED STATES PATENT OFFICE.

ALEXANDER K. SUDDOTH, OF MEMPHIS, TENNESSEE.

APPARATUS FOR MEASURING PROPORTIONAL PARTS FOR MIXTURES.

SPECIFICATION forming part of Letters Patent No. 502,596, dated August 1, 1893.

Application filed May 6, 1893. Serial No. 473,291. (No model.)

*To all whom it may concern:*

Be it known that I, ALEXANDER K. SUDDOTH, of Memphis, in the county of Shelby and State of Tennessee, have invented a new and useful Improvement in Gages, of which the following is a full, clear, and exact description.

My invention relates to a gage, and it has for its object to provide a gage adapted to determine the amount of any two or more articles to be combined to make a mixture, the articles being placed in separate compartments in the gage, and the latter being manipulated simultaneously to drop predetermined quantities from each compartment.

A further object of the invention is to provide a gage especially adapted for dental use, which may be employed for regulating the proportionate amount of mercury and amalgam, or any other two or more articles adapted to be combined to constitute a filling, or to be used in the construction of a plate, or any portion of the teeth on the plate of an artificial set of teeth, or the filling of cavities in natural teeth.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1 is a perspective view of the device, illustrating the manner in which it is held during the operation. Fig. 2 is a section taken vertically and centrally practically on the line 2—2 of Fig. 3; and Fig. 3 is a horizontal section taken practically on the line 3—3 of Fig. 2.

In carrying out the invention the body of the device consists of a tubular casing 10, which may be of any approved shape in cross section or of any desired exterior formation. The tubular casing comprises two internal chambers, designated respectively as $a$ and $a'$, the two chambers being separated by a partition 11, which partition is provided with a slot or opening 12 near each of its ends, as shown in Fig. 3. The chamber $a$, is preferably made larger than the chamber $a'$, and both chambers are open at their ends but may be closed in the manner to be hereinafter set forth. The main chamber $a$, has two apertures 13 and 14 produced in it in the bottom thereof and preferably near the center, as shown in Figs. 1 and 2. The casing 10 is likewise provided at each side of the center, or at any portion in its length beyond the center, with two or more, preferably two threaded sleeves 15, and in each of the threaded sleeves a receptacle 16, is screwed or otherwise detachably secured therein, and each of the receptacles is adapted to contain a different fluid or semi-fluid, a powder or a practically solid material. The receptacles 16, are preferably made polygonal in cross section, although their cross sectional shape may be varied or changed as fancy may dictate, and the receptacles are also made pyramidal in shape, being larger at their upper ends than at the ends where they connect with the casing; but the shape of the receptacles 16 is immaterial as is likewise the manner in which they are connected with the casing. Furthermore, the receptacles when attached to the sleeves 15, are preferably made to abut against washers 17, placed within the sleeves, and in the bottom of each sleeve, which is practically the outer surface or casing of the main chamber $a$, an aperture is formed, the aperture in one sleeve being designated as 18 and that in the second sleeve as 19, and these apertures have communication with the interior of the chamber $a$. Ordinarily and preferably one of the apertures is of less diameter than the other, but the diameters of both the apertures may be equal or practically so if in practice it is found desirable.

Within the main chamber $a$ a tubular plunger 20, is fitted to slide at one of its ends, and the plunger is usually located at that end of the casing near which the larger receiving aperture 18, is produced. The plunger 20 is tubular for the greater portion of its length, but its inner end is preferably made solid and is provided with a diametrical aperture 21, adapted to normally register with the larger receiving aperture 18 in the casing, as shown in Fig. 2; and a nut 22, is ordinarily located in the outer end of the tubular plunger 20, being preferably screwed therein, and the said nut has screwed within it a valve stem 23, provided at its inner end with a valve 24, which valve slides in an opening within the plunger and is adapted to enter to a greater or less extent the aperture 21, extending through the plunger so as to increase or decrease the capacity of the said aperture; and the valve stem is usually manipulated by turning it with a screw driver or like implement, its outer end in that event being provided with a slotted head. At the opposite side of the center a block 25, is located within the chamber $a$ of the casing. The block is stationary and between the block and the inner end of the tubular plunger 20 a space is formed, in which space the exit aperture 14 of the casing is located, and the second exit aperture 13 of the casing communicates with a chamber 26, formed longitudinally in the block 25; and near the outer end of the block 25 it is provided with an opening 27, which is in communication with the smaller receiving aperture 19 of the casing, as is likewise shown in Fig. 2.

A nut 28, is screwed into or is otherwise fastened in the end of the casing chamber $a$ near which the outer end of the block 25, is located; and the nut 28, is provided with an opening in which a rod 29 has sliding movement, which rod also enters the chamber 26 of the block 25 and has sliding movement therein. The inner end of the head of the rod 29, normally constitutes a valve, and is provided with an opening 30, extending through it, normally in communication with the receiving aperture 19. The outer end of the rod 29, is provided with a head $30^a$. Normally the aperture 21 in the tubular plunger 20, is held in registry with the receiving opening 18 of the casing, and the aperture in the valve head of the rod 29, is held in registry with the receiving opening 19, through the medium of a spring 31, which spring is located within the casing chamber $a'$, the said chamber being closed at its ends by means of plugs 32. The plunger 20, is provided with a pin 33, which extends through one of the openings 12 in the partition 11 into the chamber $a'$, and engages with one extremity of the spring 31, while the valve rod 29, is provided with a like pin 34, which engages with the opposite end of the spring. When the plunger 20 and the valve rod 29, are forced inward as far as possible, the aperture 21 in the plunger registers with the discharge opening 14 in the casing, while the opening 30 in the valve rod will register with the discharge opening 13, and whatever material may be contained in the openings of the valve rod and plunger will be delivered through the discharge openings in the casing. Thus for example, if amalgam is placed in the receptacle located over the receiving opening 18 and mercury is placed in the receptacle over the receiving opening 19, when these two articles are to be combined to produce a composite filling for example, it is desirable that a different quantity of each should be at all times delivered from the instrument; this the instrument is capable of performing, as being once set, each time it is operated the same quantity of the articles carried by it will be delivered.

In operation, the instrument is held as shown in Fig. 1, in which it will be observed that the discharge openings are in the bottom of the instrument, while the receptacles are in an upright position at the top, and the second finger engages with the head $30^a$ of the valve rod 29, while the thumb is made to engage with the outer end of the plunger 20. But the instrument may be held in any manner most convenient to the manipulator. When the plunger and valve rod are in their normal positions, the opening 21 of the plunger will be filled, for example, with amalgam, while the opening 30, in the valve rod will be filled with mercury. Now by pressing inward the valve rod and the plunger their respective openings will be brought to register with the exit and discharge openings 13 and 14, and the material contained within the openings in the valve rod and plunger will fall outward through the discharge openings in the receptacle placed to receive it, or in the hand of the operator when placed beneath the instrument, and as much of the combined materials may be delivered from the instrument as may be found necessary. It will thus be observed that the instrument is very simple, it is economic, and it is capable of being expeditiously and conveniently manipulated with the use of but one hand.

Having thus described my invention, I claim as new and desire to secure by Letters Patent—

1. A gage, the same comprising a tubular body, receptacles in communication with the body, the body being provided with discharge openings out of alignment with the discharge openings of the receptacles which lead into the body, and spring-controlled valves adapted for exterior manipulation, said valves normally registering with the discharge openings of the receptacles and being capable of registering with the discharge openings of the casing, substantially as shown and described.

2. In a gage, the combination, with a body and receptacles located in communication with the interior of the body, said body being provided with discharge openings out of alignment with the communicating openings of the receptacles, of valves located in the ends of the body, provided with pockets or openings normally registering with the discharge openings in the receptacles, said valves being capable of inward movement until their openings or pockets reach the discharge openings in the casing, and means, substantially as shown and described, for regulating the valves, as and for the purpose specified.

3. In a gage, the combination, with a tubular casing, receptacles removably connected with the casing and having discharge openings in communication with the body interior, the said body being provided with discharge openings out of alignment with the discharge openings of the receptacles, of a plunger located within the body and having spring-controlled movement therein, said plunger being provided with an opening normally in registry with a discharge opening in one of the receptacles, and means, substantially as described, for diminishing the area of said opening, and a valve also having a spring-controlled movement in the body and provided with a pocket normally in registry with the discharge opening of the other receptacle, the plunger and valve being adapted when forced inward, to discharge through the discharge openings in the casing, as set forth.

ALEXANDER K. SUDDOTH.

Witnesses:
R. H. MORGAN,
J. E. GATHRIGHT.